US009983651B2

(12) United States Patent
Agrawal et al.

(10) Patent No.: US 9,983,651 B2
(45) Date of Patent: May 29, 2018

(54) LOW-POWER NEAR-FIELD COMMUNICATION AUTHENTICATION

(71) Applicant: MOTOROLA MOBILITY LLC, Chicago, IL (US)

(72) Inventors: Jagadish Kumar Agrawal, Santa Clara, CA (US); Deepak Chandra, Mountain View, CA (US); John J. Gorsica, Round Lake, IL (US); Jagatkumar V. Shah, Lake In The Hills, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 23 days.

(21) Appl. No.: 14/295,381

(22) Filed: Jun. 4, 2014

(65) Prior Publication Data

US 2015/0019892 A1    Jan. 15, 2015

Related U.S. Application Data (60) Provisional application No. 61/846,423, filed on Jul. 15, 2013.

(51) Int. Cl.
*G06F 1/00* (2006.01)
*G06F 1/32* (2006.01)
(Continued)

(52) U.S. Cl.
CPC .............. *G06F 1/32* (2013.01); *G06F 1/1698* (2013.01); *G06F 1/3209* (2013.01);
(Continued)

(58) Field of Classification Search
CPC ............ G06F 1/26; G06F 1/32; H04B 5/0031
See application file for complete search history.

(56) References Cited

U.S. PATENT DOCUMENTS

2007/0145380 A1\* 6/2007 Shum .................... H01L 33/385
257/79
2008/0136603 A1   6/2008 Choi et al.
(Continued)

FOREIGN PATENT DOCUMENTS

CN    102461135 A    5/2012
CN    102668396 A    9/2012
(Continued)

OTHER PUBLICATIONS

Byun, "International Search Report and Written Opinion issued in International Application No. PCT/US2014/046550", dated Nov. 17, 2014, 1-14.

(Continued)

*Primary Examiner* — Austin Hicks
(74) *Attorney, Agent, or Firm* — Johnson, Marcou & Isaacs, LLC (57) ABSTRACT

This document describes techniques (400, 500, 600) and apparatuses (100, 700) for implementing low-power near-field communication (NFC) authentication. These techniques (400, 500, 600) and apparatuses (100, 700) enable a computing device (102) to detect, in a low-power state, an NFC-enabled device (104) with which to authenticate via NFC. In some embodiments, various components of a computing device (102) in a sleep state are activated to perform authentication and/or an indication is provided to a user indicating an initiation of the authentication.

15 Claims, 7 Drawing Sheets

(51) Int. Cl.
  *H04B 5/00* (2006.01)
  *G06K 7/10* (2006.01)
  *G06F 1/16* (2006.01)

(52) U.S. Cl.
  CPC .......... *G06F 1/3215* (2013.01); *G06F 1/3287* (2013.01); *G06K 7/10128* (2013.01); *H04B 5/0031* (2013.01); *Y02B 60/1282* (2013.01); *Y02B 60/32* (2013.01); *Y02B 60/50* (2013.01)

(56) References Cited

U.S. PATENT DOCUMENTS

| | | |
|---|---|---|
| 2009/0259865 A1 | 10/2009 | Sheynblat et al. |
| 2010/0313050 A1 | 12/2010 | Harrat et al. |
| 2012/0040611 A1 | 2/2012 | Griffin et al. |
| 2012/0309302 A1 | 12/2012 | Buhot |
| 2012/0322369 A1* | 12/2012 | Khan .................. H04B 5/0031 455/41.1 |
| 2013/0237153 A1* | 9/2013 | Ryu ..................... H04B 5/0043 455/41.1 |
| 2013/0337864 A1* | 12/2013 | Narayanan ................ G06F 9/54 455/552.1 |
| 2014/0128032 A1* | 5/2014 | Muthukumar .... H04M 1/72569 455/411 |
| 2014/0181535 A1* | 6/2014 | Smith ................... H04W 12/06 713/300 |
| 2015/0121108 A1* | 4/2015 | Agrawal ............... G06F 1/3206 713/323 |

FOREIGN PATENT DOCUMENTS

| | | |
|---|---|---|
| CN | 105993132 A | 10/2016 |
| EP | 2107495 A2 | 10/2009 |
| EP | 2302560 A1 | 3/2011 |
| EP | 2 421 232 A1 | 2/2012 |
| EP | 3022849 A1 | 5/2016 |
| JP | 2007520794 A | 7/2007 |
| JP | 2008283590 A | 11/2008 |
| JP | 2010157002 A | 7/2010 |
| JP | 6017737 B1 | 11/2016 |
| KR | 1020110007177 A | 1/2011 |
| KR | 10-1241293 B1 | 3/2013 |
| KR | 101241293000 | 3/2013 |
| WO | 2012132446 A1 | 10/2012 |
| WO | 2015009632 A1 | 1/2015 |

OTHER PUBLICATIONS

Nakamura, "International Preliminary Report on Patentability issued in International Application No. PCT/US2014/046550", dated Jan. 19, 2016, 10 pages.

Neeb, "European Search Report in European application No. 14826721.4", dated Feb. 3, 2017, 8 pages.

Park, "Office Action issued in Korean Application No. 10-2016-7003255 filed Feb. 4, 2016", dated Mar. 3, 2017, 16 pages.

Notification of First Office Action for Chinese Application No. 201480046063.9, dated Dec. 4, 2017.

* cited by examiner

LOW-POWER NEAR-FIELD COMMUNICATION AUTHENTICATION

BACKGROUND

This background description is provided for the purpose of generally presenting the context of the disclosure. Unless otherwise indicated herein, material described in this section is neither expressly nor impliedly admitted to be prior art to the present disclosure or the appended claims.

Computing devices often enter a sleep state responsive to expiration of an inactivity timeout or user input to do so. When entering a sleep state, a computing device typically locks (e.g., screen lock) to protect user data or prevent unintentional activation of one of the device's functionalities. Once in the sleep state, various components (or subsystems) of the computing device are powered down to reduce the device's power consumption and extend battery life.

Unlocking the computing device, however, often requires that some components of the device remain active during, or be woken prior to leaving, the sleep state. For example, when a personal identification number (PIN) code is used for device unlocking, a processor, display, and associated touch-screen require power to receive the PIN code from a user. As such, these active components continue to draw current when the device is in the sleep state, which results in increased power consumption, reduced device runtime, and/or decreased device efficiency.

BRIEF DESCRIPTION OF THE DRAWINGS

Techniques and apparatuses for low-power near-field communication (NFC) authentication are described with reference to the following drawings. The same numbers are used throughout the drawings to reference like features and components.

DETAILED DESCRIPTION

Conventional techniques for unlocking a device often rely on keeping various components of the device active to perform higher-level authentication operations. Keeping these components active while the device is in a sleep state, however, drains a battery of the device. Additionally, hardware and software interdependencies between these active components and other components of the device may prevent the device from reaching lower activity states (e.g., deeper sleep state) that provide additional power-savings.

This disclosure describes techniques and apparatuses for low-power NFC authentication, which enable a computing device to detect, while in a low-power or sleep state, an NFC enabled-device with which to authenticate. By so doing, components of the computing device may be left in respective low-power or sleep states until initiation of an authentication process to wake and/or unlock the device.

The following discussion first describes an operating environment, followed by techniques that may be employed in this environment, and ends with example apparatuses.

Operating Environment

Figure 1:
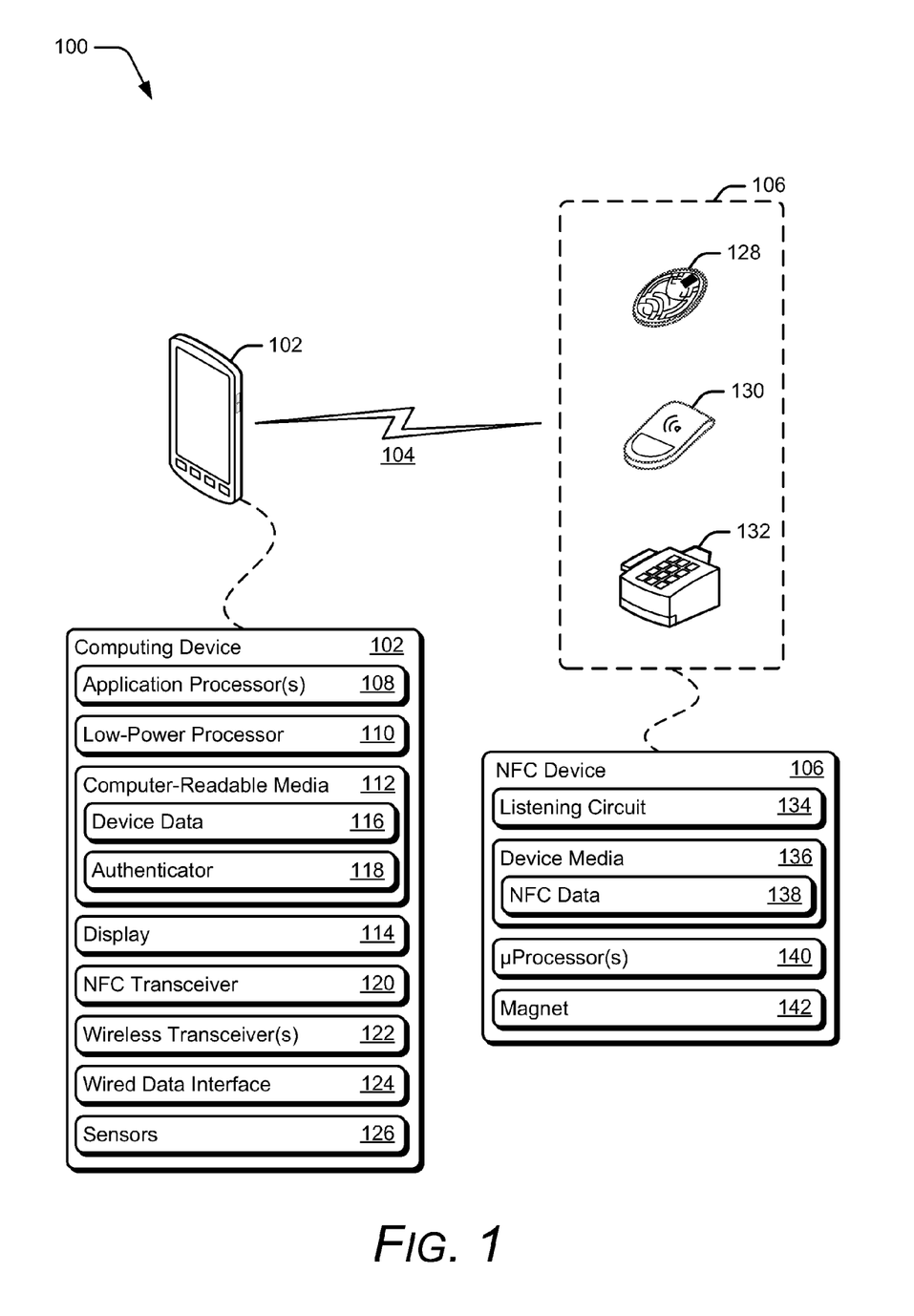
FIG. 1 illustrates an example environment in which techniques for low-power NFC authentication can be implemented.

FIG. 1 illustrates an example environment 100 in which techniques for low-power NFC authentication can be implemented. This example environment 100 includes a computing device 102, wireless communication medium 104, and near-field communication-enabled device 106 (NFC device 106). Computing device 102 can be, or include, many different types of computing or electronic devices capable of implementing authentication operations. In this example, computing device 102 is shown as a smart phone, though other devices are contemplated. Other computing devices 102 may include, by way of example only, a cellular phone, notebook computer (e.g., netbook or ultrabook), smart-watch, tablet computer, personal media player, personal navigating device (e.g., global positioning system), gaming console, desktop computer, video camera, or portable gaming device.

Computing device 102 includes application processor(s) 108 and low-power processor 110. Application processor 108 may be configured as a single or multi-core processor capable of enabling various functionalities of computing device 102. In some cases, application processor 108 includes a digital-signal processing (DSP) subsystem for processing various signals or data of computing device 102. Application processor 108 is coupled with, and implements functionalities of, other components of computing device 102 as described below.

In various embodiments, application processor 108 is a full-featured or high-power processor having multiple operational or activity states, such as full-power (dual core), partial-power (single core), or sleep (powered-down cores). Transitioning application processor 108 between these activity states, progressing from full-power to off, decreases an amount of power consumed by application processor 108. Alternately or additionally, activity states of application processor 108 may correspond with respective activity states of computing device 102. Thus, when computing device 102 enters a sleep state or low-power state, application processor 108 can enter a sleep state or low-power state in which power is conserved.

Low-power processor 110 may be configured as a low-power processor core, embedded controller, or micro-controller. Low-power processor 110 is unable to implement some of the functionalities implemented by application processor 108. In some cases, low-power processor 110 lacks function-specific data interfaces, such as a dedicated communication, memory, or display interface. Low-power processor 110 may include an interface to a general purpose data bus (parallel or serial) or general purpose input/outputs (GPIOs) with which to receive or transmit data.

Low-power processor 110 may be implemented as a reduced-instruction set computing (RISC) processor, which has a smaller instruction set, operates at a lower frequency, or has fewer processing capabilities than the application processor 108. For example, when application processor 108 is configured as a multi-core processor implementing a 32-bit instruction set, low-power processor 110 may be configured as a RISC-based micro-controller that implements a 16-bit instruction set. Application processor 108 and/or low-power processor 110 may each be implemented separately as disparate components (shown), or implemented together as an application processor with integrated companion micro-controller (not shown).

Computing device 102 includes computer readable-media 112 and display 114. Computer-readable media 112 (CRM 112) includes device data 116 and authenticator 118, which in this example is embodied as computer-executable code stored on CRM 112. Device data 116 may include an operating system, firmware, or applications of computing device 102 that are executable by application processor 108 and/or low-power processor 110. Alternately or additionally, device data 116 may include various user data, such as images, music, documents, emails, contacts, and the like.

Authenticator 118 manages authentication, security, and/or cryptographic operations of computing device 102. By way of example, authenticator 118 may lock computing device 102 when computing device 102 enters a sleep state and unlock computing device 102 responsive to authenticating a user thereof. Further implementations and uses of authenticator 118 vary and are described below in greater detail. Display 114 enables user interaction with content-related applications or graphical user-interfaces of computing device 102. In such cases, the display may be associated with, or include, a touch sensitive input device (e.g., touchscreen) through which user input is received.

Computing device 102 also includes near-field communication transceiver 120 (NFC transceiver 120), wireless transceiver(s) 122, and wired data interface 124. NFC transceiver 120 is configured to enable communication with NFC device 106 in via wireless communication medium 104 in accordance with various NFC standards, such as ISO 18000-3, ISO/SEC 18092, ECMA-340, ISO/IEC 21481, and ECMA 352, just to name a few. NFC transceiver 120 may actively search for other NFC-enabled devices within range (e.g., 20 centimeters) with which to communicate.

Wireless transceiver(s) 122 may include any suitable type of transceiver configured to communicate via a wireless network (not shown). Examples of these wireless networks include a wireless wide-area networks (WWAN), wireless local-area network (WLAN) and wireless personal-area network (wireless PAN), each of which may be configured, in part or entirely, as infrastructure, ad-hoc, or mesh networks. Computing device 102 may also communicate with other devices via wired data interface 124, which may be configured as an Ethernet transceiver or universal serial bus (USB) port.

Sensors 126 enable computing device 102 to detect or sense various properties or characteristics of an environment in which computing device 102 operates. Sensors 126 may include magnetic sensors (e.g., hall-effect or magnetometer), temperature sensors, accelerometers, global-positioning modules, motion sensitive micro-electromechanical systems (MEMS), ambient light sensors, and the like. Alternately or additionally, sensors 126 enable interaction with, or receive input from, a user of device 102. In such a case, sensors 126 may include piezo-electric sensors, microphones, cameras, capacitive touch sensors, input sensing-logic associated with hardware switches (e.g., keyboards, snap-domes, or dial-pads), and so on.

In some embodiments, sensors 126 are operably coupled with low-power processor 110, which can be configured to receive input from sensors 126. Low-power processor 110 is capable of processing the input from sensors 126 to detect properties or parameters of an environment in which computing device 102 operates. For example, low-power processor 110 can determine an orientation of, or gestures performed with, computing device 102 with respect to a three-dimensional coordinate system via accelerometers. Input received from sensors 126 may also be sent to applications executing on application processor 108 to enable environmental-based functionalities of the applications.

NFC devices 106 may be, or include, many different types of circuits or electronic devices capable of communicating via NFC. In this example, NFC devices 106 are shown as an NFC tag 128, an NFC-enabled magnetic snap 130 (NFC snap 130), and point-of-sale terminal 132. Other NFC devices 106 may include, by way of example only, an NFC sticker, radio-frequency identification (RFID) tag, NFC-enabled ring, vehicle dock, charging station, authentication token, smart phone, or camera.

Each NFC device 106 includes listening circuit 134 and NFC device media 136 (device media 136), which may include read-only memory (ROM), random-access memory (RAM), electronically erasable programmable ROM (EEPROM), and the like. Listening circuit 134 is configured to enable communication with computing device 102 through NFC via wireless communication medium 104. In cases in which NFC device 106 is not self-powered, NFC device 106 receives power from computing device 102 via listening circuit 134. The power received from computing device 102 powers the components of NFC device 106 to enable various functionalities thereof.

Device media 136 stores NFC device data 138 (NFC data 138), which may include any suitable type of data, such as a unique identification number of NFC device 106 (e.g., serial number), tag data, uniform resource identifier (URIs), uniform resource locator, passwords, private keys, network-setup information, and so on. NFC data 138 is formatted in accordance with NFC data exchange format (NDEF) or another suitable data format (e.g., proprietary or encrypted). Alternately or additionally, NFC data 138 may be structured (e.g., serialized, packetized, or framed) for communication or transport using these data formats.

Some NFC devices 106 also include micro-processor(s) 140 (μprocessor(s) 140) and magnet 142. Micro-processor 140 can be implemented as an embedded controller or micro-controller capable of performing various data processing tasks. Micro-processor 140 may also access device media 136 to read, write, or otherwise manipulate NFC data 138. Magnet 142 generates a magnetic field that is detectable external to NFC device 106 and may be any suitable type of magnet, such as ferrous or rare earth (e.g., neodymium). Some NFC devices 106 may include multiple magnets 142 to provide other functionalities, such as magnetic clasping or attachment to other metallic or magnetic objects.

Figure 2:
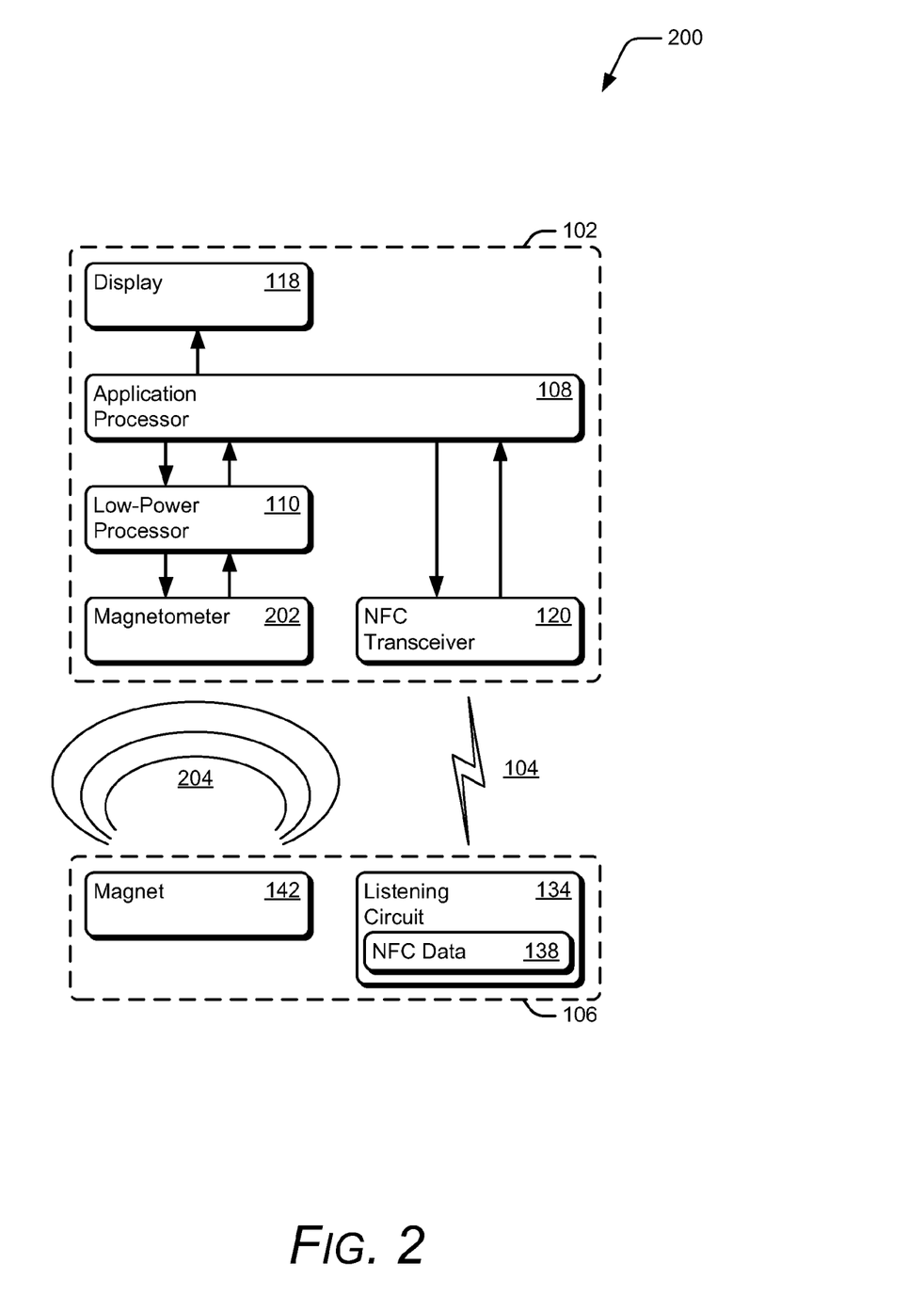
FIG. 2 illustrates example device configurations capable of implementing low-power NFC authentication.

FIG. 2 illustrates example device configurations 200 that capable of implementing one or more embodiments of low-power NFC authentication. In this particular example, computing device 102 is proximate NFC device 106 that includes listening circuit 134, NFC data 138, and magnet 142. NFC data 138 includes authentication information (not shown) useful to authenticate a user of computing device 102. For example, when computing device 102 is locked, transmission of the authentication information from NFC device 106 to computing device 102 via wireless communication medium 104 enables authentication of the user and unlocking of computing device 102.

When computing device 102 is in a low-power state (e.g., sleep or standby), application processor 108, display 118, and NFC transceiver 120 of computing device 102 are powered-down to their respective low-power states. In the context of this example, other components of computing device 102 (not shown for visual brevity) may also by powered-down to their respective low-power states. Alternately or additionally, functionalities of computing device 102 are locked to protect user data or prevent unintentional activation of the functionalities (e.g., accidental touch dialing).

Low-power processor 110, which remains in at least a semi-active state while computing device 102 sleeps, is operably coupled with magnetometer 202. Magnetometer 202 is a magnetic sensor configured to detect changes in magnetic field strength around computing device 102. Low-power processor 110 monitors magnetometer 202 to detect these changes in magnetic field strength, which may indicate a presence of magnetically-enabled NFC devices 106 (e.g., NFC snap 130). The use of low-power processor 110 to detect other devices enables application processor 108 and NFC transceiver 120 to remain in low-power states, which conserves power of computing device 102. In the context of this example, low-power processor 110 can sense, via magnetometer 202, magnetic field 204 generated by magnet 142 of NFC device 106.

Once the presence of NFC device 106 is detected, low-power processor 110 can wake application processor 108 to initiate authentication operations with NFC device 106. For example, application processor can implement, via authenticator 118, authentication operations using authentication data received from NFC device 106 via NFC transceiver 120. Alternately or additionally, application processor can turn on display 118 to notify a user of the initiation of authentication operations. Authenticator 118 can then unlock computing device 102 on completion of the authentication operations with NFC device 106.

Leaving application processor 108 and/or NFC transceiver 120 in low-power states until NFC device 106 is detected can enable considerable power savings in a computing device 106. Alternately or additionally, the use of low-power processor 110 and magnetometer 202 to wake components that perform authentication operations may also preclude a user from having to wake computing device 102 (e.g., via hardware button) or manually enter authentication information.

Figure 3:
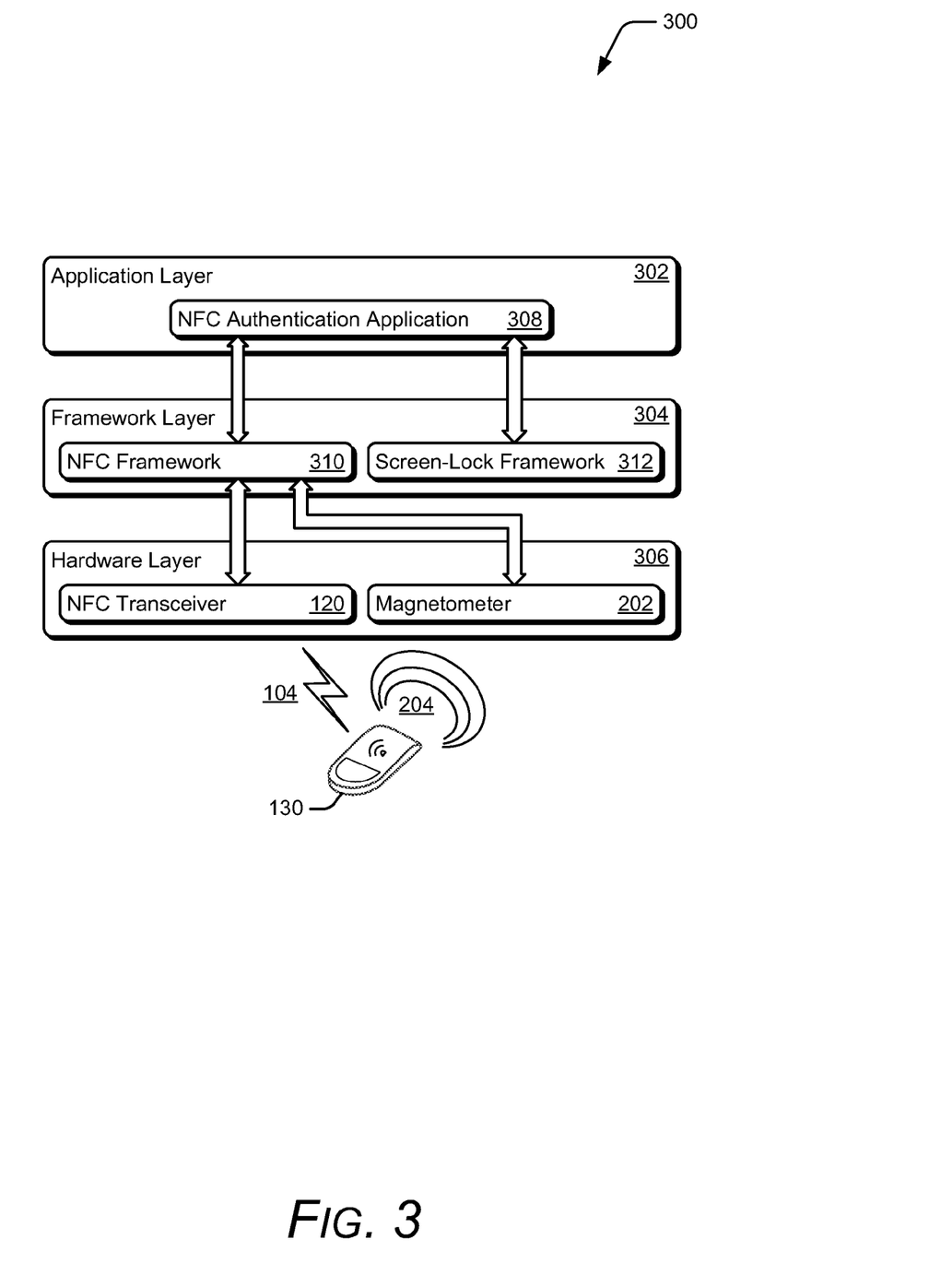
FIG. 3 illustrates an example stack architecture for implementing embodiments of low-power NFC authentication in a device.

FIG. 3 illustrates an example stack architecture 300 for implementing embodiments of low-power NFC authentication in a device. Stack architecture 300 includes application layer 302, framework layer 304, and hardware layer 306, in which functionalities of computing device 102 are implemented. Applications of computing device 102, such as NFC authentication application 308, execute via application processor 108 and are implemented in application layer 302. NFC authentication application 308 may be implemented in association with authenticator 118 to perform various authentication operations. Applications of application layer 302 access data, services, and other resources of computing device 102 via framework layer 304. Framework layer 304, or components thereof, is provided by an operating system (not shown) of computing device 102 that is also executed by application processor 108. Thus, functionalities of application layer 302 and framework layer 304 are enabled when application processor 108 is an active state.

Hardware components of computing device 102 are implemented in hardware layer 306, which in this example includes NFC transceiver 120 and magnetometer 202. Hardware components in hardware layer 306 may operate independent of an activity state of computing device 102 or higher-level layers of stack architecture 300. For example, when computing device 102 is in a low-power state, magnetometer 202 or NFC transceiver 120 may remain powered and/or in an active state. In the context of stack architecture 300, magnetometer 202 is monitored by low-power processor 110 (not shown) while application processor 108 is in a low-power state. Alternately or additionally, NFC interface 120 may actively search for other NFC-enabled devices while computing device 102 or application processor 108 is in a low-power state.

As shown by stack architecture 300, changes of magnetic field strength detected by magnetometer 202 can initiate operations in other layers of the architecture stack. By way of example, assume that computing device 102 is placed in proximity (e.g., zero to five centimeters) of NFC snap 130 as shown. Also assume that computing device 102 is locked and in a sleep state, in which application processor 108 and NFC transceiver 120 are also in respective low-power states. Here, low-power processor 110 detects, via magnetometer 202, magnetic field 204 generated by NFC snap 130. Low-power processor 108 then wakes application processor 108 to enable application layer 302 and framework layer 304, which in turn enables functionalities of those layers.

The change in magnetic field strength sensed by magnetometer 202 is communicated to NFC framework 310, which then initiates communication with NFC snap 130 via NFC transceiver 120 over wireless communication medium 104. Here, NFC authentication application 308 queries NFC snap 130 for authentication information with which to perform various authentication operations. NFC authentication application 308 is configured to authenticate a user of computing device 102 or authenticate with an NFC device 106 enabling higher-level interaction therewith (e.g., data exchange, streaming content, or network configuration). In the context of the present example, NFC authentication application 308 authenticates a user with which NFC snap 130 is associated and unlocks computing device 102 via screen-lock framework 312.

Example Techniques

The following discussion describes techniques for low-power NFC authentication, which enable a computing device to detect, in a low-power state, an NFC-enabled device with which to authenticate via NFC. In at least some embodiments, the computing device detects the NFC-enabled device via a magnetic sensor precluding the need for a user to initiate authentication operations. These techniques can be implemented utilizing the previously described environment, such as authenticator 118, NFC transceiver 120, and/or sensors 126 of FIG. 1. These techniques include example methods illustrated in FIGS. 4-6, which are shown as operations performed by one or more entities. The orders in which operations of these methods are shown and/or described are not intended to be construed as a limitation, and any number or combination of the described method operations can be combined in any order to implement a method, or an alternate method, including any of those illustrated by FIGS. 4-6.

Figure 4:
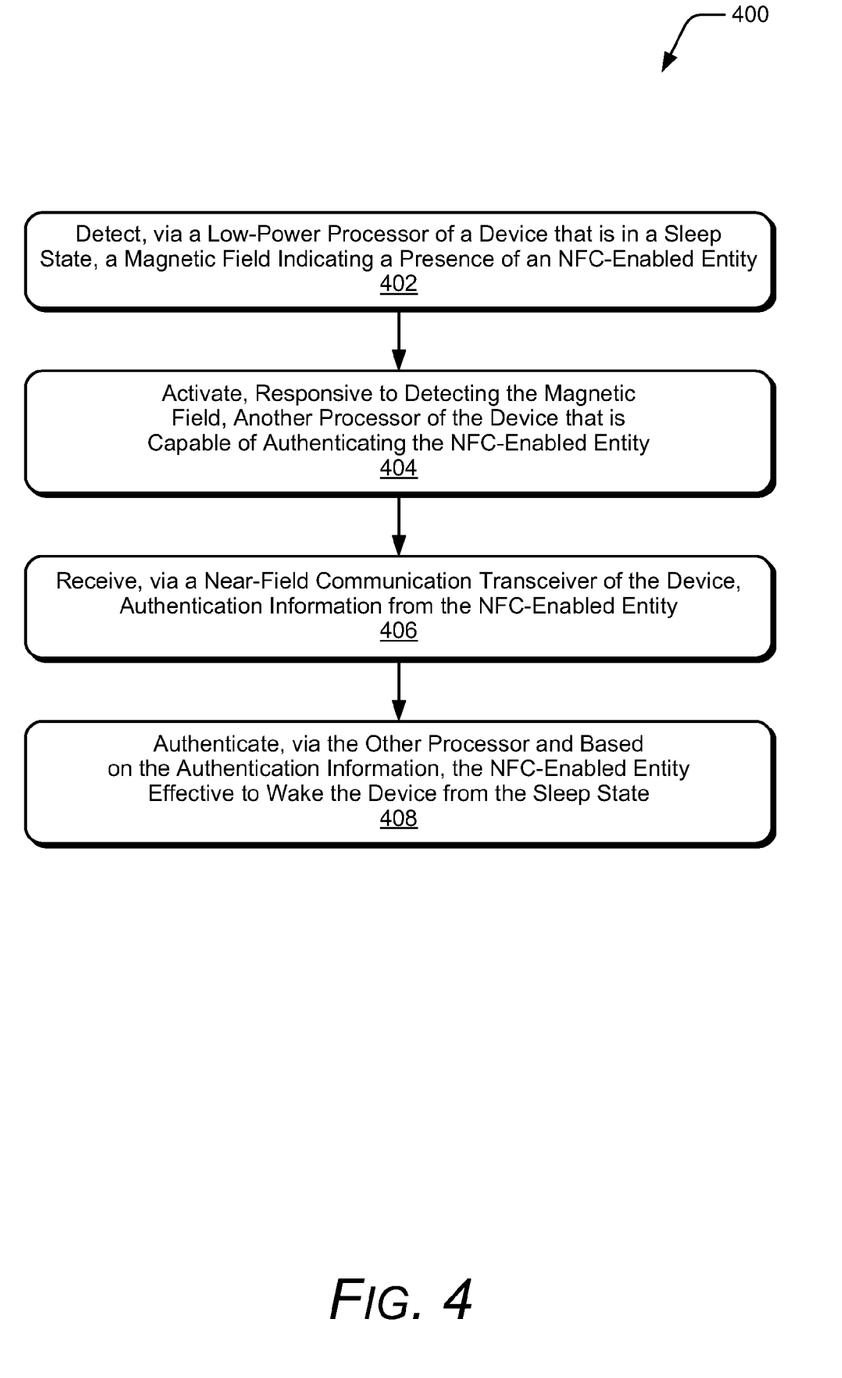
FIG. 4 illustrates a method of low-power NFC authentication in accordance with one or more embodiments.

FIG. 4 illustrates an example method 400 of low-power NFC authentication in accordance with one or more embodiments.

At 402, a magnetic field that indicates a presence of an NFC-enabled entity is detected. The magnetic field is detected by a low-power processor of a device that is in a sleep state and/or locked. The low-power processor detects the magnetic field my monitoring a magnetic sensor, such as a magnetometer or hall-effect sensor. The NFC-enabled device may include any suitable NFC device, such as an NFC snap, NFC sticker, NFC ring, or other NFC devices described herein.

Consider an example in which a user locked their smart phone and possesses an NFC snap that includes their authentication information. In the context of example operating environment 100 and devices configurations 200, computing device 102 (a smart phone in this example) enters a sleep state when locked, and application processor 108, display 114, NFC transceiver 120, and other components are powered-down into low-power states to conserve power. Low-power processor 110 then monitors sensors 126 while computing device 102 is in the sleep state, including magnetometer 202 for changes in magnetic field strength.

Assume here that the user of computing device 102 desires to check their email via an application of computing device 102 (currently locked) and that the user possesses an NFC snap 130 that includes the user's authentication information. The user taps computing device 102 to NFC snap 130 to initiate an unlock sequence. Here, when computing device 102 approaches NFC snap 130 (e.g., within three centimeters), low-power processor 110 detects magnetic field 204 generated by magnet 142, which indicates the presence of NFC snap 130.

At 404, another processor of the device is activated in response to detection of the magnetic field, which indicates the presence of the NFC-enabled entity. This other processor is an application processor or full-featured processor of the device that is capable of implementing authentication and communication functionalities of the device. In some cases, the other processor is a DSP subsystem of the device that consumes less power than an application processor, yet is powerful enough to implement the authentication and communication functionalities of the device.

In the context of the present example, low-power processor 110 activates application processor 108, which in turn implements authenticator 118 and NFC transceiver 120. Other components of computing device 102, such as display 118, wireless transceivers 122, and wired data interface 124 remain in low-power states to continue saving power of computing device 102.

At 406, authentication information is received from the NFC-enabled entity via an NFC transceiver of the device. The authentication information may include a unique identification number, serial number of the NFC-enabled entity, previously transmitted random number, cryptographic hash number, or any suitable combination thereof. This authentication information enables subsequent authentication operations to be performed for verifying an identity of the NFC-enabled entity or a user in possession thereof.

In the ongoing example, authenticator 118 establishes NFC communications with NFC snap 130 via NFC transceiver 122. Authenticator 118 then queries NFC snap 130 for authentication information associated with the user of computing device 102. Here, assume that the authentication information includes a unique serial number of NFC snap 130 that is appended with a random number previously programmed into NFC data 138 by computing device 102.

At 408, the NFC-enabled entity is authenticated based on the authentication information received via NFC. Authenticating the NFC-enabled entity includes comparing the received authentication information with known authentication information, which may be stored locally on the device. The authentication is performed using the other processor of the device, through which the NFC framework and authentication applications of the device are accessed. Once authentication is successful, the device is woken from the sleep state to implement the operating system and application(s) of the device. Alternately or additionally, the device can be unlocked from a locked state to enable user access of the device.

Concluding the present example, authenticator 118 of computing device 102 compares the authentication information received from NFC snap 130 with local authentication information stored in device data 116. This local authentication information includes the serial number of NFC snap 130 and the random number that computing device 102 had previously programmed into NFC 130. Assume here that authenticator 118 determines that the received authentication information matches the local authentication information. Authenticator 118 then wakes the other components of computing device 102 and unlocks computing device 102 so the user can access their email application.

Figure 5:
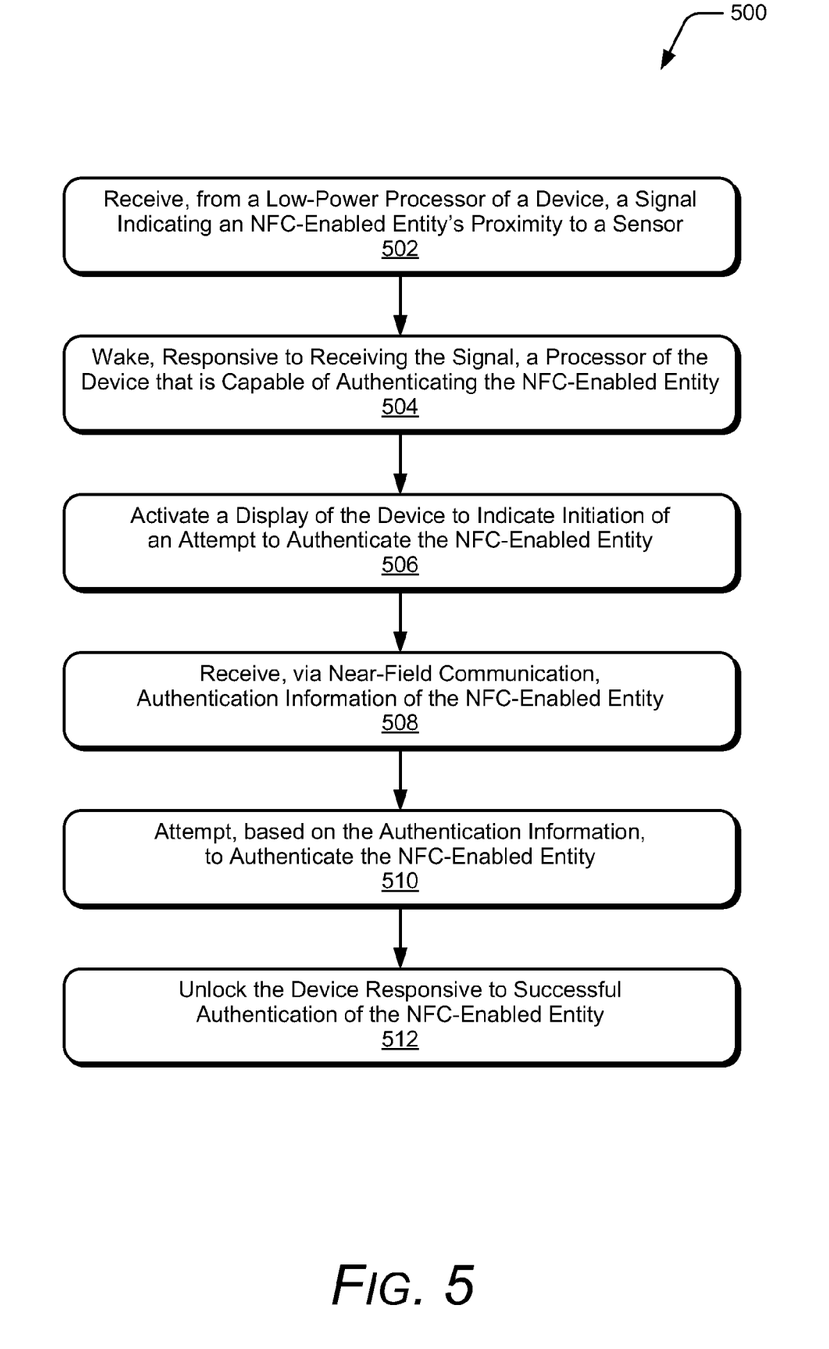
FIG. 5 illustrates another method of low-power NFC authentication in accordance with one or more embodiments.

FIG. 5 illustrates another example method 500 of low-power NFC authentication in accordance with one or more embodiments.

At 502, a signal is received from a low-power processor of a device that is locked. The signal indicates proximity or contact with an NFC-enabled entity, such as an NFC device that includes authentication information (e.g., NFC snap 130). The low-power processor monitors sensors of the device to detect the proximity of the NFC-enabled entity. These sensors may include magnetic sensors, accelerometers, capacitive sensors, microphones, and the like. The signal is received by another processor of the device that is in a sleep state or low-power state. Alternately or additionally, the signal is received by an entity associated with the other processor (e.g., authenticator 118).

At 504, the other processor of the device is woken from a low-power state in response to receiving the signal. Prior to detecting the proximity of the NFC-enabled entity, the other processor resides in the low-power state to conserve energy of the device. This other processor is an application processor or a DSP subsystem of the device, which is capable of implementing authentication operations and/or communicating with the NFC-enabled entity.

At 506, a display of the device is activated to indicate initiation of an attempt to authenticate the NFC-enabled entity. Alternately or additionally, a vibrational motor or LED indicator of the device may be activated indication initiation of the attempt to authenticate. In some cases, the display may present a graphical indication of the authentication, such as a lock-screen animation, visual indication of authentication progress (e.g., progress bar), an icon identifying of the NFC-enabled entity (by name or type), and the like.

At 508, authentication information of the NFC-enabled entity is received via an NFC interface of the device. The NFC interlace may include an NFC transceiver, NFC resources in a stack framework layer, and an NFC application that is capable of NFC-based authentication. In some cases, the NFC interface of the device is activated from a low-power state prior to receiving the authentication information. As discussed above with respect to the other processor of the device, leaving the NFC interface in the low-power state until the NFC-enabled entity is detected permits the computing device to conserve power.

At 510, authentication of the NFC-enabled entity is attempted using the authentication data received via the NFC interface. The attempt to authenticate is executed via the other processor of the device, which is capable of implementing the authentication operations. In some cases, the authentication operations are implemented by a DSP subsystem of the device, precluding the need to activate an application processor. This attempt to authenticate is performed prior to waking other components the device, enabling power to be conserved until an attempt to authenticate is successful.

At 512, the device is unlocked in response to successful authentication of the NFC-enabled entity. Unlocking the device is effective to enable access to data and/or functionalities of the device. In some cases, an indication of the unlocking is presented to a user via a display or speaker, such as removal of a lock-screen or playback of an audio alert. In other cases, additional components of the device can activated from low-power states to fully wake the device prior to the unlocking. Alternately, the device may remain locked in response to not authenticating of the NFC-enabled entity.

Figure 6:
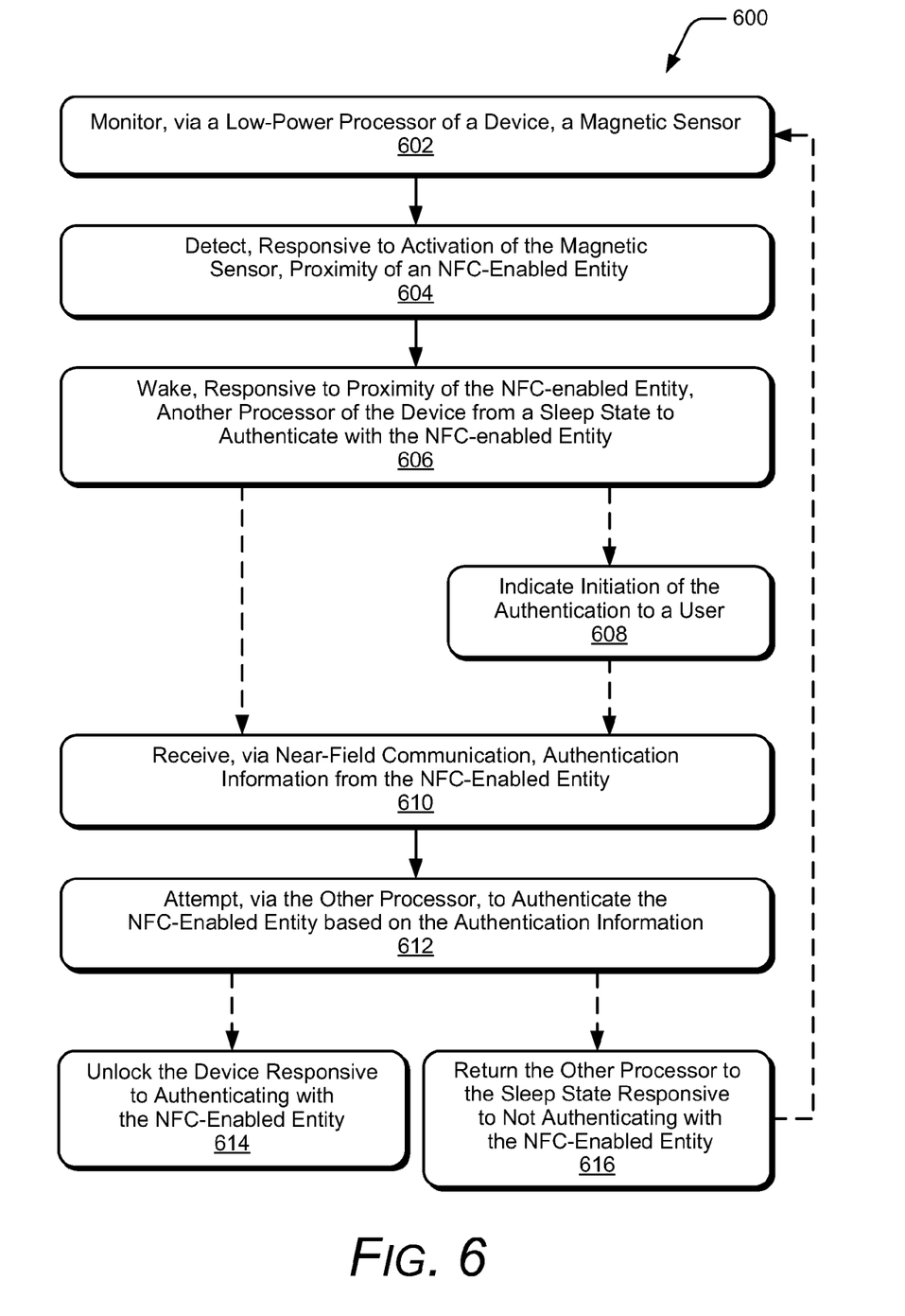
FIG. 6 illustrates example method(s) for authenticating with an NFC-enabled entity using low-power NFC authentication.

FIG. 6 illustrates example method(s) 600 for authenticating with an NFC-enabled entity using low-power NFC authentication.

At 602, a magnetic sensor is monitored via a low-power processor of a computing device. The magnetic sensor is monitored while the computing device, and other components thereof, are in respective low-power or sleep states. The computing device is also locked to prevent unauthorized access of user data or functionalities of the computing device. In some cases, the low-power processor is unable to implement functionalities enabled by the other processor, such as authentication and/or communication.

At 604, proximity of an NFC-enabled entity is detected responsive to activation of the magnetic sensor. The magnetic field associated with the NFC enabled device may be detected over a range of zero to five centimeters. In some cases, the NFC-enabled entity is a device associated with a user, such as a ring, magnetic snap, token, watch, bracelet, identification card, and the like. The NFC-enabled entity may be momentarily "tapped" against the computing device or remain in close proximity for an extended period of time.

At 606, another processor of the computing device is woken from a sleep state to authenticate with the NFC-enabled entity. The other processor is woken in response to detection of the NFC-enabled entity. This other processor is an application processor or full-featured processor of the computing device that is capable of implementing authentication and communication functionalities of the device. In some cases, the other processor is a DSP subsystem of the computing device that is capable of implementing the authentication and communication functionalities, yet may not be powerful enough to fully wake the device.

Optionally at 608, initiation of an authentication process is indicated to a user of the computing device. The initiation of the authentication may be indicated using any suitable user-perceptible output of the computing device, such as a display, LED indicator, vibrational motor, and the like. For example, the computing device may vibrate in a pulsed manner or blink an LED indicator to alert the user of the authentication process. The indication may be effective to preclude the user from having to manually wake the phone or re-initiate contact with the NFC-enabled entity.

At 610, authentication information is received from the NFC-enabled entity via an NFC communication interface (e.g., NFC transceiver 120). The authentication information may include a unique identification number, serial number of the NFC-enabled entity, previously transmitted random number, cryptographic hash number, or any suitable combination thereof. This authentication information enables subsequent authentication operations to be performed for verifying an identity of the NFC-enabled entity or a user in possession thereof.

At 612, authentication with the NFC-enabled entity is attempted based on the authentication information. The authentication attempt is executed via the other processor of the computing device. This attempt to authenticate can be performed prior to fully waking the computing device, enabling power to be conserved until a determination is made to unlock the device. From operation 612, method 600 proceeds to operation 614 responsive to successfully authenticating with the NFC-enabled device, or proceeds to operation 616 responsive to an unsuccessful attempt to authenticate with the NFC-enabled device.

At 614, the computing device is unlocked in response to authenticating with the NFC-enabled entity. Unlocking the computing device is effective to enable access to user data or functionalities of the computing device that were previously inaccessible. Prior to unlocking, the computing device and other components thereof may be awoken or activated from their respective low-power or sleep states.

At 616, the other processor is returned to a sleep state in response to not authenticating with the NFC-enabled device. By so doing, power of the computing device is saved until a subsequent attempt of authentication. Alternately or additionally, the failure to authenticate with the NFC-enabled entity may be logged for later analysis. For example, the failure and associated identification information of the NFC-enabled entity may presented when a user unlocks computing device 102 to alert the user of possible attempts by unknown entity to access the device. From operation 616, method 600 returns to operation 602 where the low-power processor resumes monitoring the magnetic sensor to detect another NFC-enabled entity.

Example Electronic Device

Figure 7:
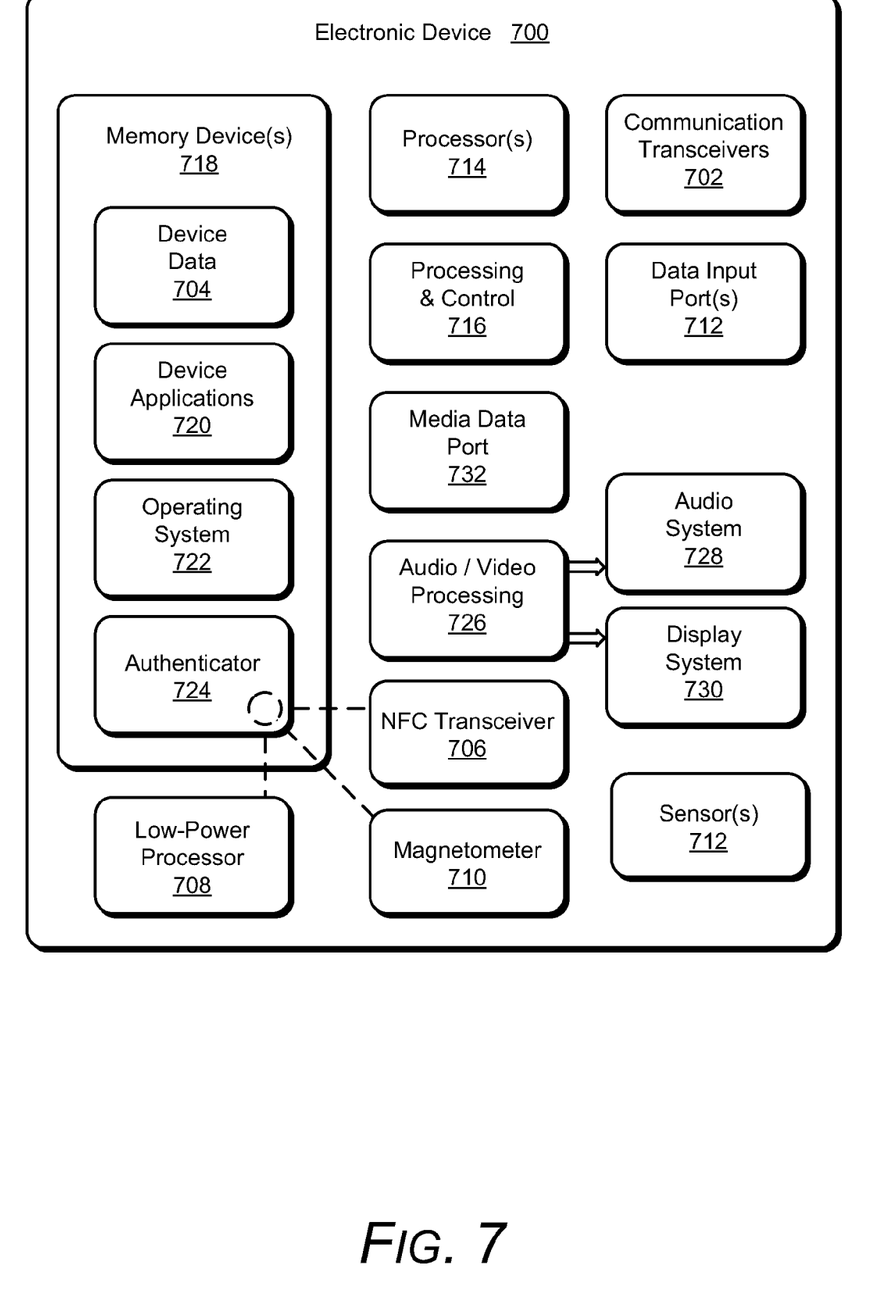
FIG. 7 illustrates various components of an electronic device that can implement techniques for low-power NFC authentication.

FIG. 7 illustrates various components of an example electronic device 700 that can be implemented as a computing device as described with reference to any of the previous FIGS. 1-6. The device may be implemented as any one or combination of a fixed or mobile device, in any form of a consumer, computer, portable, user, communication, phone, navigation, gaming, messaging, Web browsing, paging, media playback, and/or other type of electronic device, such as the computing device 102 described with reference to FIG. 1.

Electronic device 700 includes communication transceivers 702 that enable wired and/or wireless communication of device data 704, such as received data and transmitted data. Example communication transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN, 3GPP-compliant) radios for cellular telephony, wireless metropolitan area network (WMAN) radios compliant with various IEEE 802.16 (WiMAX™) standards, and wired local area network (LAN) Ethernet transceivers. Electronic device 700 also includes NFC module 706, such as NFC module 120 as described above, to enable NFC communication with other devices or listener circuits.

In embodiments, the electronic device 700 includes low-power processor 708, such as low-power processor 110 described with reference to FIG. 1. The electronic device 800 may also include magnetometer 710 and sensor(s) 712, such as magnetometer 202 and sensor(s) 126 described with reference to FIGS. 1 and 2. The low-power processor 708, NFC transceiver 706, and magnetometer 710 can be implemented to facilitate low-power NFC authentication. For example, when the electronic device 700 enters a sleep or low-power state, low-power processor 708 and magnetometer 710 can be leveraged to detect, while more-powerful processors and other subsystems of electronic device 700 remain powered-down, another device with which to authenticate.

Electronic device 700 may also include one or more data input ports 712 via which any type of data, media content, and/or inputs can be received, such as user-selectable inputs, messages, music, television content, recorded video content, and any other type of audio, video, and/or image data received from any content and/or data source. Data input ports 712 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

Electronic device 700 of this example includes processor system 714 (e.g., any of microprocessors, digital-signal-processors, controllers, and the like), or a processor and memory system (e.g., implemented in an SoC), which process (i.e., execute) computer-executable instructions to control operation of the device. Processor system 714 (processor(s) 714) may be implemented as an application processor or full-power processor, such as application processor 108 described with reference to FIG. 1. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 716 (processing and control 716). Although not shown, electronic device 700 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 700 also includes one or more memory devices 718 that enable data storage, examples of which include random access memory (RAM), non-volatile memory (e.g., read-only memory (ROM), flash memory, EPROM, EEPROM, etc.), and a disk storage device. Memory device 718 provides data storage mechanisms to store the device data 704, other types of information and/or data, and various device applications 720 (e.g., software applications). For example, operating system 722 can be maintained as software instructions within memory device 718 and executed by processors 714. In some aspects, authenticator 724 is embodied in memory devices 718 of electronic device 700 as executable instructions or code. Although represented as a software implementation, authenticator 724 may be implemented as any form of a control application, software application, signal-processing and control module, firmware that is installed on the device, a hardware implementation of the controller, and so on.

Electronic device 700 also includes audio and/or video processing system 726 that processes audio data and/or passes through the audio and video data to audio system 728 and/or to display system 730. Audio system 728 and/or display system 730 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 732. In some implementations, audio system 728 and/or display system 730 are external components to electronic device 700. Alternatively or additionally, display system 730 can be an integrated component of the example electronic device, such as part of an integrated touch interface. As described above, authenticator 724 may use display system 730, or components thereof, in some aspects of low-power NFC authentication. For example, when electronic device 700 is in a sleep or low-power state, authenticator 724 may activate display system 730 to indicate initiation of an authentication process to a user while other components of electrical device 700 remain in a low-power state.

Although embodiments of low-power NFC authentication have been described in language specific to features and/or methods, the subject of the appended claims is not necessarily limited to the specific features or methods described. Rather, the specific features and methods are disclosed as example implementations of low-power NFC authentication.

What is claimed is:

1. A method, comprising:
   detecting, via a low-power processor of a computing device that is in both a sleep state and a locked state, a magnetic field indicating a presence of a near-field communication-enabled (NFC-enabled) entity,
   wherein the computing device comprises a display that is powered-down while the computing device is in the sleep state,
   wherein the lower-power processor is not capable of authenticating the NFC-enabled entity,
   wherein a higher-power processor of the computing device that is capable of authenticating the NFC-enabled entity is in a sleep state, the higher-power processor consuming more power compared to the lower power processor, and
   wherein the higher-power processor of the computing device is an application processor that is operably coupled with an NFC interface;
   waking, responsive to detecting the magnetic field and via the lower-power processor, the higher-power processor of the computing device such that the higher-power processor transitions from the sleep state to an active state;
   receiving, via the near-field communication (NFC) interface of the computing device, authentication information from the NFC-enabled entity;
   authenticating, via the higher-power processor and based on the received authentication information, the NFC-enabled entity;
   responsive to detecting the magnetic field, powering the display of the computing device to indicate an initiation of the acts of activating, receiving, or authenticating the computing device; and
   responsive to authenticating the NFC-enabled entity, waking, by the higher-power processor, the computing device from the sleep state and unlocking the computing device.

2. The method as recited in claim 1, wherein the lower-power processor is not capable of communicating via the NFC interface of the computing device.

3. The method as recited in claim 1, wherein, prior to detecting the magnetic field, the NFC interface is in a sleep state, and the method further comprising, prior to receiving the authentication information, activating the NFC interface to enable communication with the NFC-enabled entity.

4. The method as recited in claim 1, wherein the computing device comprises a light-emitting diode (LED) indicator or a vibrational motor, and indicating the initiation of the acts of activating, receiving, or authenticating includes altering a state of the LED indicator or causing actuation of the vibrational motor.

5. The method as recited in claim 1, wherein the magnetic field is detected via a magnetic sensor monitored by the lower-power processor when the computing device is in the sleep state.

6. The method as recited in claim 1, wherein the computing device further comprises a magnetic sensor monitored by the lower-power processor when the computing device is in the sleep state, wherein the NFC-enabled entity comprises an NFC circuit storing the authentication information and a magnet generating the magnetic field, and wherein the magnetic field generated by the magnet of the NFC-enabled entity is detected by the computing device via the magnetic sensor monitored by the lower-power processor when the computing device is in the sleep state.

7. A computing device, comprising:
a near-field communication (NFC) transceiver configured to enable wireless communication of data;
a sensor configured to detect magnetic field strength;
a lower-power processor unable to perform NFC authentication operations and configured to:
monitor the sensor for changes in magnetic field strength caused by a presence of a near-field communication-enabled (NFC-enabled) entity; and
in response to detection of a change in magnetic field strength, transmit a notification of a detection of a magnetic field to a higher-power processor;
the higher-power processor having a sleep state in which power of the device is conserved, and an active state in which authentication operations and other functionalities of the computing device are implemented, the higher-power processor consuming more power compared to the lower-power processor, wherein the higher-power processor is operably coupled with the NFC transceiver, and wherein the higher-power processor is an application processor that is operably coupled with an NFC interface, the higher-power processor being configured to:
detect, while the computing device is in both the sleep state and a locked state, a magnetic field via the lower-power processor indicating the presence of the NFC-enabled entity, wherein the computing device comprises a display that is powered-down while the computing device is in the sleep state;
wake, responsive to detecting the magnetic field via the lower-power processor, from the sleep state to the active state;
receive, via the NFC transceiver, authentication information transmitted via an NFC antenna from the NFC-enabled entity;
authenticate the NFC-enabled entity based on the authentication information received via the NFC transceiver from the NFC-enabled entity;
responsive to receiving the notification of the detection of the magnetic field from the lower-power processor, power the display of the computing device to indicate an initiation of the acts of activating, receiving, or authenticating the computing device; and
responsive to authenticating the NFC-enabled entity, wake the computing device from the sleep state and unlock the computing device.

8. The computing device as recited in claim 7, further comprising the display, wherein the higher-power processor is further configured to indicate, via the display, the locked state of the computing device or the unlocked state of the computing device.

9. The computing device as recited in claim 7, the computing device comprising a smart-phone, smart-watch, tablet computer, laptop computer, personal media player, or portable gaming device.

10. The computing device as recited in claim 7, wherein the computing device further comprises a magnetic sensor monitored by the lower-power processor when the computing device is in the sleep state, wherein the NFC-enabled entity comprises an NFC circuit storing the authentication information and a magnet generating the magnetic field and wherein the magnetic field generated by the magnet of the NFC-enabled entity is detected by the computing device via the magnetic sensor monitored by the lower-power processor when the computing device is in the sleep state.

11. A method, comprising:
monitoring, via a lower-power processor of a computing device in both a sleep state and a locked state, a magnetic sensor of the computing device for changes in magnetic field strength;
detecting, via the lower-power processor of the computing device, a magnetic field via the magnetic sensor indicating a presence of a near-field communication-enabled (NFC-enabled) entity, wherein the NFC-enabled entity comprises a magnet, and wherein the magnetic field is detected within a predetermined distance of the magnetic sensor of the computing device, wherein the computing device comprises a display that is powered-down while the computing device is in the sleep state,
wherein the lower-power processor is not capable of authenticating the NFC-enabled entity,
wherein a higher-power processor of the computing device that is capable of authenticating the NFC-enabled entity is in a sleep state, the higher-power processor consuming more power compared to the lower-power processor, and
wherein the higher-power processor of the computing device is an application processor that is operably coupled with an NFC interface;
waking, responsive to detecting the magnetic field via the lower-power processor, the higher-power processor of the computing device such that the higher-power processor transitions from the sleep state to an active state;
receiving, via a near-field communication (NFC) interface of the computing device, authentication information from the NFC-enabled entity;
executing, via the higher-power processor and based on the received authentication information, an authentication of the NFC-enabled entity;
responsive to detecting the magnetic field, powering the display of the computing device to indicate an initiation of the acts of activating, receiving, or authenticating the computing device; and
responsive to authenticating the NFC-enabled entity, waking, by the higher-power processor, the computing device from the sleep state and unlocking the computing device.

12. The method of claim 11, further comprising displaying, via the display of the computing device, an indication of the unlocking of the computing device in response to authenticating the NFC-enabled entity.

13. The method as recited in claim 11, wherein the lower-power processor is unable to perform the authentication with the NFC-enabled entity or to communicate via the NFC interface of the computing device.

14. The method as recited in claim 11, further comprising indicating, via a light-emitting diode (LED) indicator or vibrational motor of the computing device, an initiation of an attempt to authenticate the NFC-enabled entity.

15. The method as recited in claim 11, further comprising activating, while the computing device is in the locked state, a display of the computing device to display an indication of an initiation of the authentication of the NFC-enabled entity.

* * * * *